US011167389B2

(12) United States Patent
Doettling et al.

(10) Patent No.: US 11,167,389 B2
(45) Date of Patent: Nov. 9, 2021

(54) MACHINE FOR WORKPIECE PROCESSING

(71) Applicant: TRUMPF LASER GMBH, Schramberg (DE)

(72) Inventors: Juergen Doettling, Schramberg (DE); Robert Ganter, Gerlingen (DE); Rainer Banholzer, Boesingen (DE)

(73) Assignee: TRUMPF LASER GMBH, Schramberg (DE)

( * ) Notice: Subject to any disclaimer, the term of this patent is extended or adjusted under 35 U.S.C. 154(b) by 211 days.

(21) Appl. No.: 16/270,967

(22) Filed: Feb. 8, 2019

(65) Prior Publication Data
US 2019/0168349 A1 Jun. 6, 2019

Related U.S. Application Data

(60) Division of application No. 14/660,294, filed on Mar. 17, 2015, now Pat. No. 10,245,696, which is a
(Continued)

(30) Foreign Application Priority Data

Sep. 18, 2012 (DE) .......................... 102012216632.7

(51) Int. Cl.
*B23K 26/30* (2014.01)
*B23Q 1/66* (2006.01)
(Continued)

(52) U.S. Cl.
CPC ........ *B23Q 11/0825* (2013.01); *B23K 26/706* (2015.10); *B23Q 1/66* (2013.01); *B23Q 11/0891* (2013.01)

(58) Field of Classification Search
CPC .. A61M 1/3655; A61M 1/14; A61M 39/0247; A61M 25/0606; A61M 25/0631;
(Continued)

(56) References Cited

U.S. PATENT DOCUMENTS 3,517,159 A 6/1970 Milochevitch
4,156,124 A 5/1979 Macken
(Continued)

FOREIGN PATENT DOCUMENTS

CN 1426342 6/2003
CN 201208695 3/2009
(Continued)

OTHER PUBLICATIONS

KR Office Action in Korean Appln. No. 10-2015-7009150, dated Sep. 20, 2019, 13 pages (with English translation).
(Continued)

*Primary Examiner* — Ibrahime A Abraham
*Assistant Examiner* — Gyounghyun Bae
(74) *Attorney, Agent, or Firm* — Fish & Richardson P.C.

(57) ABSTRACT

A workpiece processing machine includes a separation device for dividing an operating space into a processing region and at least one additional operating region, a laser processing head configured to process the workpiece, and a rotary workpiece changer having a rotatable workpiece support for transporting the workpiece between the processing region and the at least one additional operating region by an opening. The rotatable workpiece support has a protection wall configured to shield the at least one additional operating region with respect to the processing region. The separation device has a protection element movable between a processing position and a transport position and configured to be in abutment with the protection wall in the processing position to close the opening and spaced apart from the protection wall in the transport position. A spacing between the processing position and the transport position is adjustable based on a dimension of the workpiece.

10 Claims, 1 Drawing Sheet

Related U.S. Application Data continuation of application No. PCT/EP2013/068922, filed on Sep. 12, 2013.

(51) Int. Cl.
  *B23Q 11/08* (2006.01)
  *B23K 26/70* (2014.01)

(58) Field of Classification Search
  CPC .. A61M 2039/0258; A61M 2039/0291; B23K 26/706; B23K 26/00; B23K 26/356; B23Q 11/0825; B23Q 11/66; B23Q 11/0891; A47L 2201/00; A61B 34/00; B25J 3/04; B25J 9/00; B25J 9/0081; B25J 9/16; B25J 13/00; B25J 9/0084; B25J 9/1682; G05B 2219/39; G05B 19/418; G05D 1/00; G05D 2201/02; Y10S 901/00
  USPC ....... 219/121.85; 451/65, 451; 700/248, 245
  See application file for complete search history.

(56) References Cited

U.S. PATENT DOCUMENTS

| | | | |
|---|---|---|---|
| 4,205,216 A * | 5/1980 | Douglas | B23K 26/02 |
| | | | 219/121.6 |
| 4,404,505 A | 9/1983 | Swanson | |
| 4,596,919 A | 6/1986 | Kremers et al. | |
| 4,657,345 A | 4/1987 | Gordon | |
| 4,677,278 A | 6/1987 | Knoll | |
| 4,688,983 A | 8/1987 | Lindbom | |
| 4,732,148 A | 3/1988 | L'Esperance, Jr. | |
| RE32,794 E | 12/1988 | Engelberger | |
| 4,812,641 A | 3/1989 | Ortiz, Jr. | |
| 5,183,993 A * | 2/1993 | Sato | B23K 26/0838 |
| | | | 219/121.78 |
| 5,342,156 A * | 8/1994 | Baba | B23Q 11/0891 |
| | | | 408/710 |
| 5,364,210 A | 11/1994 | Rutschle et al. | |
| 5,464,963 A * | 11/1995 | Hostler | B23K 26/0823 |
| | | | 219/121.6 |
| 5,482,414 A | 1/1996 | Hayashi | |
| 5,536,137 A * | 7/1996 | Jager | B23Q 1/66 |
| | | | 414/788.7 |
| 5,643,477 A * | 7/1997 | Gullo | B23K 26/12 |
| | | | 219/121.6 |
| 5,658,476 A * | 8/1997 | Gullo | B23K 26/12 |
| | | | 219/121.86 |
| 5,760,366 A | 6/1998 | Haruta | |
| 6,147,320 A | 11/2000 | Bernecker | |
| 6,147,323 A * | 11/2000 | Erickson | B23K 26/12 |
| | | | 219/121.82 |
| 6,176,656 B1 | 1/2001 | Seong | |
| 6,257,811 B1 | 7/2001 | Schweizer | |
| 6,314,686 B1 * | 11/2001 | Scherer | B23K 26/12 |
| | | | 219/121.21 |
| 6,621,091 B2 * | 9/2003 | Pratt | B23K 26/0861 |
| | | | 250/559.33 |
| 6,649,868 B2 * | 11/2003 | Pratt | B23K 26/12 |
| | | | 219/121.82 |
| 6,675,549 B1 | 1/2004 | Kaneda | |
| 6,772,932 B1 * | 8/2004 | Halstead | B23K 37/0235 |
| | | | 219/125.1 |
| 7,114,907 B2 | 10/2006 | Ogawa | |
| 7,238,916 B2 * | 7/2007 | Samodell | B23K 9/323 |
| | | | 219/125.1 |
| 7,627,937 B2 | 12/2009 | Jung | |
| 8,210,419 B1 | 7/2012 | Dangel | |
| 8,460,066 B2 | 6/2013 | Araki | |
| 9,027,215 B2 | 5/2015 | Sueoka | |
| 2002/0090898 A1 * | 7/2002 | Giebmanns | B23Q 11/08 |
| | | | 451/65 |
| 2003/0099522 A1 | 5/2003 | Laempe | |
| 2004/0011773 A1 | 1/2004 | Fritz | |
| 2004/0138782 A1 | 7/2004 | Passmore | |
| 2005/0100826 A1 | 5/2005 | Sato | |
| 2006/0108342 A1 | 5/2006 | Samodell | |
| 2006/0259195 A1 * | 11/2006 | Eliuk | B65B 55/16 |
| | | | 700/245 |
| 2007/0060022 A1 | 3/2007 | Wirz | |
| 2009/0017733 A1 | 1/2009 | Takahashi | |
| 2009/0079121 A1 | 3/2009 | Smolarek | |
| 2010/0277736 A1 * | 11/2010 | Goebel | F16P 1/06 |
| | | | 356/434 |
| 2011/0030276 A1 | 2/2011 | Smith | |
| 2011/0068089 A1 | 3/2011 | Kettner-Reich | |
| 2012/0205350 A1 | 8/2012 | Stadtmueller | |
| 2015/0196976 A1 | 7/2015 | Doettling et al. | |

FOREIGN PATENT DOCUMENTS

| | | |
|---|---|---|
| CN | 101456138 | 6/2009 |
| DE | 3734722 | 11/1988 |
| DE | 4306093 | 9/1994 |
| DE | 19907617 | 8/2000 |
| DE | 102006022304 | 11/2007 |
| EP | 0313872 | 5/1989 |
| EP | 0642883 | 3/1995 |
| JP | H06246583 A | 9/1994 |
| JP | 2012024776 | 2/2012 |

OTHER PUBLICATIONS

International Search Report for corresponding PCT Application No. PCT/EP2013/068922, dated Feb. 18, 2014, 4 pages.

Notification of Transmittal of Translation of the International Preliminary Report on Patentability and Written Opinion of the International Search Authority for corresponding PCT Application No. PCT/EP2013/068922, dated Apr. 2, 2015, 17 pages.

\* cited by examiner

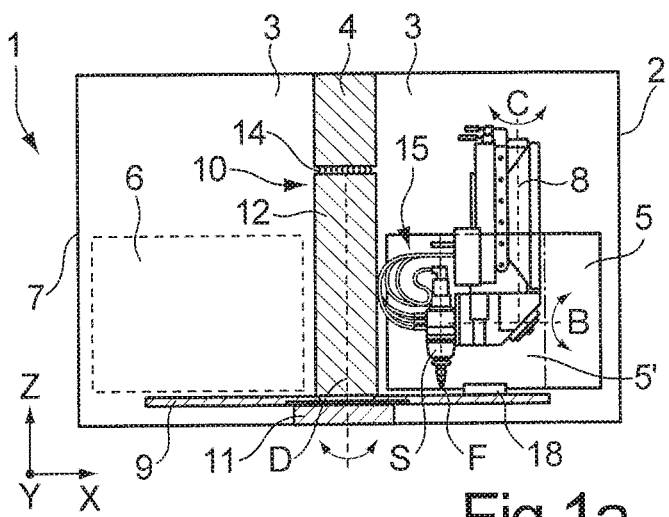
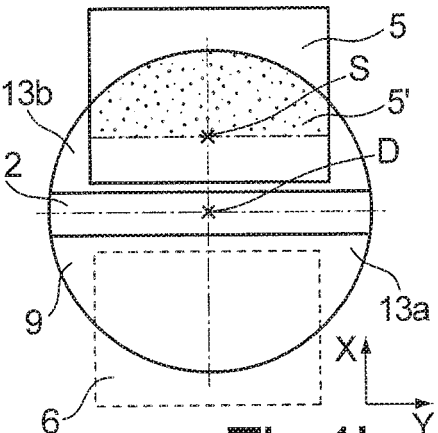
Fig.1a  Fig.1b
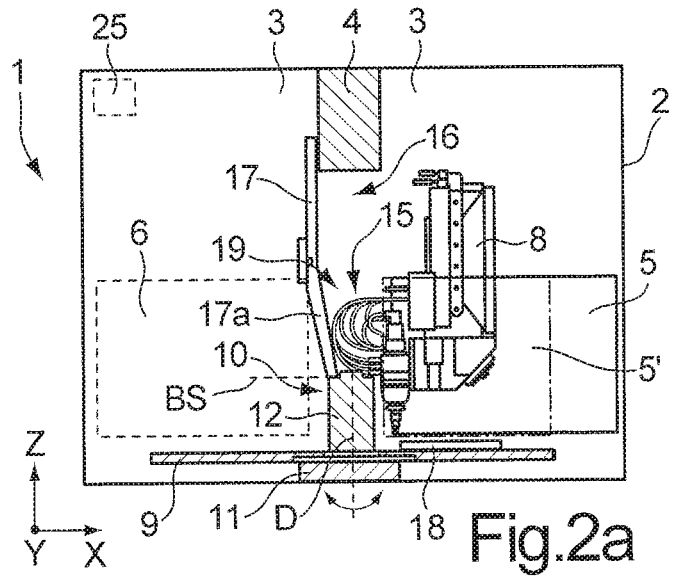
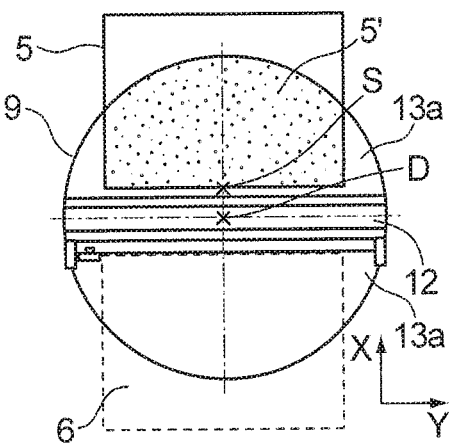
Fig.2a  Fig.2b
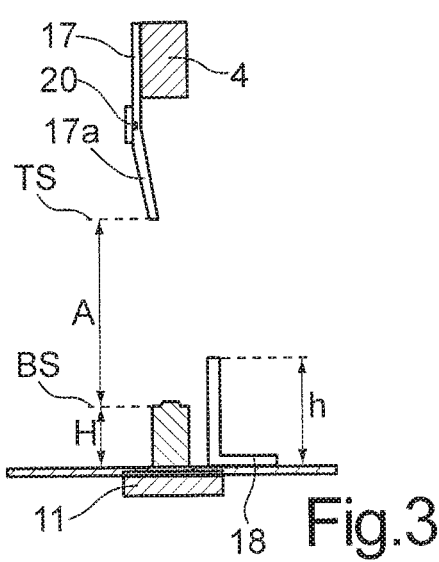
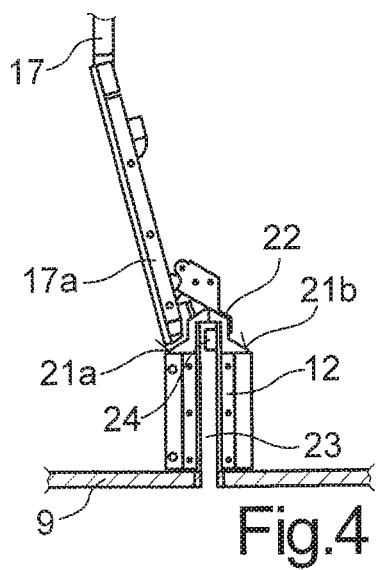
Fig.3  Fig.4

MACHINE FOR WORKPIECE PROCESSING

CROSS-REFERENCE TO RELATED APPLICATIONS

This application is a divisional of and claims priority under 35 U.S.C. § 120 to U.S. application Ser. No. 14/660,294, filed on Mar. 17, 2015, which is a continuation of and claims priority under 35 U.S.C. § 120 to PCT Application No. PCT/EP2013/068922 filed on Sep. 12, 2013, which claimed priority to German Application No. DE 10 2012 216 632.7, filed on Sep. 18, 2012. The contents of these priority applications are hereby incorporated by reference in their entirety.

TECHNICAL FIELD

The invention relates to methods, devices and systems for workpiece processing, particularly a processing machine having an access region separated from a processing region by a movable protection element.

BACKGROUND

DE 10 2006 022 304 A1 discloses a method for decentralized control of a processing machine, in particular a laser processing machine. The processing machine comprises a processing region which is surrounded by a protection housing. A monitored access region to the processing region is separated from the processing region by means of a separation device in the form of a partition wall. In one example, the processing machine has a rotary changer having a loading and unloading station and having a processing station. The loading and unloading station of the rotary changer is separated from the processing station by means of a rotating protection wall. Owing to a rotary movement of the rotary changer, the workpiece can be transported from the processing region into the access region and back.

The rotating protection wall which is mounted on the rotary changer is intended to protect the access region from radiation from the processing region when the workpiece is processed or to shield it from the radiation. In order to carry out a light-impermeable shielding, it is necessary to seal the rotating protection wall of the rotary workpiece changer against the edges of an opening which is formed in the partition wall for the passage of the workpiece, in a light-impermeable manner. The sealed edges are conventionally constructed with elastomer seals or brush seals. The high laser powers which are generally used during workpiece processing involve high energy densities which may damage or destroy the seals. It is therefore generally necessary to protect the seals from the laser radiation by means of additional sliding members or metal protection sheets, which can better withstand the laser radiation.

When the rotating protection wall is used, the problem may additionally arise that a processing of the workpiece close to the protection wall is made more difficult or where applicable impossible since the processing head forms an interference contour. The surface on the rotatable workpiece support, which surface is accessible using the processing head, and consequently the processing region of the processing machine is thereby reduced.

SUMMARY

One aspect of the invention features a workpiece processing machine with a separation device configured to divide an operating space into a processing region for processing a workpiece and at least one additional operating region; a laser processing head configured to process the workpiece in the processing region; and a rotary workpiece changer having a rotatable workpiece support for transporting the workpiece between the processing region and the at least one additional operating region by using an opening formed in the separation device, the rotatable workpiece support having a protection wall configured to shield the at least one additional operating region with respect to the processing region when the workpiece is processed. The separation device has a protection element movable between a processing position and a transport position and configured to be in abutment with the protection wall in the processing position to close the opening and spaced apart from the protection wall in the transport position. A spacing between the processing position and the transport position of the protection element is adjustable based on one or more dimensions of the workpiece.

One aim of the invention is to improve the operational safety and/or increase the compactness of the processing machine. Since no workpiece processing operation takes place when the workpiece located on the workpiece support is transported, a light-impermeable sealing between the processing region and the at least one additional operating region is not required during the rotational movement of the workpiece support. Therefore when the workpiece is transported, the protection element can be moved into the transport position spaced apart from the protection wall, without the operational safety decreasing. Owing to the movable protection element, the use of resilient seals at the edges of the opening or the protection wall and metal protection sheets or screens in order to shield the seals can be dispensed with.

The separation device may, for example, be constructed in the manner of a partition wall. The opening provided in the separation device is partially covered by the protection wall which rotates with the rotatable workpiece support. Owing to the protection wall, it is possible to reduce the path which the protection element has to travel between the processing position and the transport position, whereby the cycle time during transport is reduced. The protection element may in particular partially or completely comprise a metal material, for example, aluminum, which typically enables particularly effective shielding from (laser) radiation produced during the processing operation. The protection element is typically moved in a (vertical) lifting movement from the processing position into the transport position, but it is also possible to carry out another type of movement of the protection element, for example, a pivot movement.

The rotatable workpiece support may, for example, be constructed in the manner of a (round) rotary plate, but other geometries are also possible, for example, the workpiece support may have a rectangular or a square form. The protection wall may divide the rotatable workpiece support into two part-regions which have the same surface-area, but a division into three or more equally sized part-regions is also possible. Owing to a rotation of the workpiece support through a corresponding angle (180°, 120°, etcetera), the association of the part-regions of the rotatable workpiece support with respect to the respective regions can be changed or exchanged.

In a development of this first aspect or in a second aspect of the invention, for which protection is also claimed independently of the first aspect, there is formed at the opening of the separation device adjacent to the protection wall a free space for engagement of a part-region of the processing head.

Owing to the provision of the free space adjacent to the rotatable protection wall, the processing of the workpiece can also be carried out in the direct vicinity of the protection wall since the part-region of the processing head which forms an interference contour for the processing operation can engage in the free space. In this manner, the surface of the rotatable workpiece support, which surface can be reached by the processing head, and consequently the processing region of the processing machine can be increased. This enables compact construction of the processing machine in combination with the processing of workpieces which are as large as possible.

Of course, when a processing head in the form of a laser processing head is used, it must be ensured when the free space is provided that the opening in the separation device is closed in a light-impermeable manner during the processing of the workpiece. This can be carried out in the above-described aspect of the invention by the movable, in particular slidable, protection element.

However, it is also possible to move the separation device at least in the region of the opening in a direction facing away from the processing region parallel with the protection wall so that a free space is formed above the protection wall and can be sealed in the above-described manner. It is also possible, in order to form the free space, to arrange the separation device or the partition wall in the extension of the protection wall but to reduce the separation device or the partition wall in terms of thickness directly above the opening and to form them only at a side facing away from the processing region. Of course, in a processing machine, in which not a laser processing operation, but instead another type of processing operation, for example, a cutting processing operation, is carried out, a light-impermeable sealing between the protection wall and the separation device can be dispensed with.

In a preferred embodiment, the protection element is mounted on a side of the separation device facing away from the processing region. Owing to such a mounting, the above-described free space above the protection wall can be produced in a simple manner and the operating region of the processing machine can consequently be increased.

In a development, the protection element has an extension arm which is inclined in the direction towards the protection wall and which can be positioned in the processing position with the free end thereof at a side of the protection wall facing away from the processing region. The extension arm may in particular be brought into abutment with the free end thereof with a shoulder which is formed at the upper side of the protection wall in order to bring about a light-impermeable closure of the opening. The protection element (with or without the extension arm) is preferably constructed in one piece.

In another embodiment, the protection element engages over the protection wall in the processing position. In this instance, the upper end of the protection wall is surrounded by the protection element at both sides, whereby passage of laser radiation can be prevented in a particularly effective manner.

In a development, the protection element for engaging over the protection wall has a shielding, for example, a metal shielding sheet, which can be positioned in the processing position at a side of the protection wall facing the processing region. The shielding may be mounted, for example, in the region of the free end of the extension arm. The use of a thin shielding is advantageous in order not to impair the engagement of the processing head in the free space formed above the protection wall.

In an advantageous embodiment, the protection element can be moved in a linear manner, in particular can be displaced in a linear manner, between the processing position and the transport position, in particular in a vertical direction (that is to say, in a lifting or lowering movement). The linear movement can be carried out in a particularly rapid manner, for example, by means of a linear (direct) drive so that the cycle time can be minimized. The protection wall or the rotation axis of the rotary workpiece changer typically also extends in a vertical direction.

In another embodiment, a spacing between the processing position and the transport position of the protection element can be adjusted in dependence of the dimensions of the workpiece, in particular the height of the workpiece. For the transport of the workpiece, the protection element has to be lifted only to such an extent that the protection element does not collide with the workpiece during the rotation movement. It is therefore advantageous for the protection element or the separation device to be provided with a controllable drive which enables the protection element to be positioned with different spacings from the fixed processing position. A control device which is provided in the processing machine may serve to control the drive for the protection element in dependence of data concerning the dimensions, in particular (in the case of a vertical rotation axis) concerning the height of the workpiece which is intended to be processed or which has been processed. These data are stored in a storage device, which the control device can access. Of course, the (linear) movement of the protection element is possible only up to a maximum spacing from the processing position, which spacing is dependent on the structural shape of the processing machine and which may, for example, be in the order of magnitude of approximately 600 mm. It is self-evident that, in the transport position, the value must not fall below a minimum spacing (for example, approximately 50 mm) between the protection element and the protection wall so that it is ensured that the protection wall passes the protection element during the rotary movement.

In another embodiment, a hollow space is formed in the protection wall and/or in the protection element. The hollow space of the protection wall and optionally also of the protection element can be used to receive components, such as supply lines and/or control components, for example, of valves or the like.

In a development, at least one sensor for detecting processing radiation entering the hollow space is/are arranged in the hollow space of the protection wall and/or in the hollow space of the protection element. The hollow space is generally closed in a light-impermeable manner. Using the sensor, it can be identified promptly when the protection wall and/or the protection element is damaged by the processing radiation in the processing region since the damage allows processing radiation into the hollow space. Damage to the protection element and/or the protection wall may, in spite of the use of laser-resistant materials, occur, for example, when processing radiation which is reflected by the workpiece strikes the protection wall and/or the protection element with high energy density in a narrowly delimited region. The sensor may in particular be signal connected to a control device in order in the event of a failure to transmit a warning to an operator and/or in order to stop the processing operation or to deactivate the beam source used for the processing operation. In order to be able to readily monitor the hollow space, it is advantageous for the protection element and/or the protection wall to be constructed in one piece.

Another aspect of the invention is implemented in a method for processing a workpiece by means of a processing machine, which is constructed as described above, the method comprising: in a step which precedes the processing operation: moving the protection element into the processing position, in which the protection element is in abutment with the protection wall, and after the processing operation: moving the protection element from the processing position into the transport position and rotating the rotatable workpiece support to move the processed workpiece from the processing region into an additional operating region.

In the additional operating region, the workpiece may, for example, be taken from the processing machine. However, it is also possible, after the workpiece has been processed in the processing region, for a subsequent processing operation of the workpiece to be carried out at least in one additional operating region. It is also possible, before the workpiece is transported into the processing region, to already carry out one or more preparatory processing steps on the workpiece in other operating regions.

In a development of this method or in a method which corresponds to the second inventive aspect of the processing machine described above, a part-region of the processing head is moved into a free space above the protection wall when the workpiece is processed. As has been set out above, when the workpiece which is positioned on the rotatable workpiece support is processed the operating region can thereby be increased. As set out above, it is advantageous in this instance in particular during the laser processing, but not absolutely necessary, for the closure of the opening to be carried out by means of a movable protection element.

In a variant of the method, a spacing between the processing position and the transport position of the protection element is determined in dependence of the dimensions of the workpiece, in particular the height of the workpiece. Owing to the adjustment of the opening extent of the protection element which functions in the manner of a protection door, the path travelled by the protection element or, in the event of a vertical movement of the protection element, the lifting action can be adapted to the workpiece dimensions. Owing to the reduction of the movement path of the protection element, the time required to transport the workpiece can be minimized.

Other advantages of the invention will be appreciated from the description and the drawings. The features mentioned above and those set out below may also be used individually per se or together in any combination. The embodiments shown and described are not intended to be understood to be a conclusive listing but are instead of exemplary character for describing the invention.

DESCRIPTION OF DRAWINGS

FIG. 1a and FIG. 1b are a schematic side view and a plan view of a rotary workpiece changer of a processing machine which has a rotatable workpiece support having a rotating protection wall, respectively.

FIG. 2a and FIG. 2b are schematic illustrations similar to FIG. 1a and FIG. 1b with a protection element which can be lifted and lowered in a processing position, in which the protection element is in abutment with a rotating protection wall.

FIG. 3 is a schematic illustration of a rotary workpiece changer with a protection element in a transport position for transporting a workpiece which is supported on a rotatable workpiece support.

FIG. 4 is a schematic detailed illustration of a protection element, which engages over a protection wall at the upper side thereof.

DETAILED DESCRIPTION

FIGS. 1a, b show a processing machine 1 in the form of a laser processing machine, e.g., for thermally processing a workpiece not shown in FIGS. 1a, b. The processing machine 1 has a protection housing 2 in which an operating space 3 is formed. The operating space 3 is in the present example divided by a separation device 4 in the form of a partition wall into a processing region 5 and another operating region 6. The additional operating region 6 serves to load and unload workpieces via a protection door 7 which is mounted to the protection housing 2 and via which the additional processing region is accessible for an operator or for a mechanical loading and unloading device. A laser processing head 8 serves to process the workpiece within the processing region 5.

The laser processing head 8 is mounted to a kinematic guide for travel. This may be constructed, for example, as a rotary guide in the form of a robot (not shown). Alternatively, the laser processing head 8 is mounted to a coordinate guide (not shown) and can be displaced thereon by means of suitable drives in the X direction, Y direction and Z direction of an XYZ coordinate system. The processing head 8 can additionally be rotated about a vertical rotation axis (C axis). The processing head 8 is in the present example constructed in several parts and has a housing portion, which can be rotated about a rotation axis (B axis) which is perpendicular relative to the C axis. In the processing head 8, an optical focusing unit which is not illustrated in greater detail is arranged in order to focus a laser beam which is supplied by a laser source in order to process the workpiece at a focal point F (also referred to as the "tool center point" (TCP)). The laser processing head 8, more specifically the focal point F, can be moved by means of the drives within the rectangular or parallelepipedal processing region 5, which is illustrated in FIGS. 1a, b. Only in a portion of this processing region 5 which is theoretically accessible for the laser processing head 8 can a processing operation of the workpiece be carried out, as set out in greater detail below.

When the workpiece is processed, it is positioned on a rotatable workpiece support in the form of a rotary plate 9 which is a component of a rotary workpiece changer 10. The rotary workpiece changer 10 has a rotary drive 11 in order to rotate the rotary plate 9 about a central vertical rotation axis D. There is mounted on the rotary plate 9 a protection wall 12 which extends in the longitudinal direction thereof over the entire diameter of the rotary plate 9 and which divides the surface of the rotary plate 9 into two part-faces 13a, b of the same size, which can each be used to support the workpiece. The diameter of the rotary plate 9 is dependent on the application and may, for example, be in the order of magnitude of approximately 1 meter.

In the position of the rotary plate 9 shown in FIGS. 1a, b, the longitudinal direction of the protection wall 12 extends parallel with the direction in which the partition wall 4 also extends (Y direction). By means of a seal which is fitted between the partition wall 4 and the protection wall 12 and which in the present example is produced by means of brushes 14 which engage one inside the other (cf. FIG. 1a), when the workpiece is processed, a light-impermeable shielding of the processing region 5 is produced with respect to the additional operating region 6. A transport of the workpiece between the processing region 5 and the additional operating region 6 before or after the processing operation is produced by means of a rotational movement of the rotary plate 9 about the rotation axis D with a rotation angle of 180°.

In the processing machine 1 shown in FIGS. 1a, b, there is the problem that the material of the seal 14 can generally not withstand laser radiation with a high energy density, so that additional components are required to protect the seal 14 against laser radiation produced during the processing operation, for example, in the form of additional screens. Another problem is that the processing head 8 itself forms an interference contour since a part-region 15 of the processing head 8 protrudes in the X direction beyond the beam axis S, along which the laser beam is guided to the focal point F. In the present instance, the part-region 15 is formed substantially by supply lines which are used, for example, for gas supply or (cooling) water supply, and by electrical lines. However, it is self-evident that protruding housing portions of the processing head 8 may also form an interference contour for the processing operation.

Owing to the protruding part-region 15 of the processing head 8, a processing of the workpiece positioned on the rotary plate 9 can be carried out only with spacing with respect to the protection wall 12, which spacing corresponds at least to the width of the protruding part-region 15 (in the X direction). The maximum processing region 5 which can be used for the processing operation is additionally limited in the XY plane by the dimensions of a part-face 13a and 13b of the rotary plate, respectively, since the outer workpiece contours have to be located within the outer diameter of the rotary plate 9 during the rotation movement. As can be seen in particular with reference to FIG. 1b, the interference contour 15 leads to a comparatively wide surface adjacent to the protection wall 12 not being available for processing so that the processing region 5 is limited to the surface portion 5' illustrated with broken lines in FIG. 1b.

FIGS. 2a, b show a processing machine 1 in which the above-described problems can be prevented. In the processing machine 1, the protection wall 12 of the rotary workpiece changer 10 is shortened in terms of height (Z direction) with respect to the protection wall 12 of FIGS. 1a, b so that it no longer protrudes upwards beyond the processing region 5. An opening 16, which is provided in the partition wall 4 in order to transport the workpiece on the rotary plate 9, is only partially covered by the protection wall 12. In order to shield the additional operating region 6 with respect to the processing region 5 during the workpiece processing operation, there is mounted to the partition wall 4 a protection element 17 (lifting door) which can be moved, that is to say, raised and lowered, in the vertical direction (Z direction) by means of a linear drive which is not described in greater detail.

In FIG. 2a, the protection element 17 is shown in an operating position BS, in which the protection element 17, more specifically an extension arm 17a of the protection element 17, is in abutment with a shoulder formed on the upper side of the protection wall 12. The protection wall 12 and the protection element 17 close the opening 16 in a light-impermeable manner in the operating position BS so that no laser radiation from the processing region 5 can reach the additional operating region 6. In order to shield incident laser radiation, the protection element 17 may, for example, at least at the outer side thereof facing the processing region 5, comprise a metal material, which reflects the laser radiation so that damage to the protection element 17 by laser radiation reflected on the processed workpiece 18 is unlikely.

The protection element 17 is mounted to the side of the partition wall 4 facing away from the processing region 5. In this manner, there is formed between the lower side of the partition wall 4 and the upper side of the protection wall 12 a free space 19 which can be used to introduce the protruding part-region 15 of the laser processing head 8 into the free space 19. In this manner, the laser processing head 8 can be moved closer to the protection wall 12 than is the case with the processing machine 1 of FIGS. 1a, b, so that the surface portion 5' in the XY plane which can be used for workpiece processing is accordingly increased, as can be seen in FIG. 2b. As can be seen in FIG. 2a, the lower side of the (three-dimensional) processing region 5 is spaced apart from the upper side of the rotary plate 9. This is advantageous in order to provide space for a receiving device for receiving planar or three-dimensional workpieces during the processing operation, for example, for a cutting box or for collet chucks on a rotary shaft.

FIG. 3 shows a detail of the processing machine 1 of FIGS. 2a, b with the protection element 17 in a transport position TS, in which the protection element 17 is spaced apart with respect to the protection wall 12 with a spacing A in a vertical direction. In the illustration selected in FIG. 3, the protection element 17 is illustrated with a maximum possible spacing A with respect to the protection wall 12. Of course, however, the protection element 17 does not have to be moved in each case into a transport position TS, in which it has the maximum possible spacing A with respect to the protection wall 12. Instead, it is advantageous for the spacing A to be selected in dependence of the dimensions of the workpiece 18 in such a manner that the total of the height H of the protection wall 12 and the spacing A is greater than the height h of the workpiece 18 positioned on the rotary plate 9 (measured from the upper side of the rotary plate 9). The total H+A in this instance is intended not significantly (generally by a maximum of 10-20%) to exceed the height h of the workpiece 18 in order to minimize the movement path of the protection element 17 and consequently the time required to transport the workpiece 18.

FIG. 4 is a detailed illustration of the protection element 17 and the protection wall 12 in the processing position BS, in which both engage one inside the other for light-impermeable closure of the opening 16 (not shown in FIG. 4). As described above, the substantially plate-like protection element 17 has an extension arm 17a, which is inclined in the processing position BS towards the protection wall 12. As shown in FIG. 4, the extension arm 17a can be positioned with the free end thereof on a side of the protection wall 12 facing away from the processing region 5, more specifically on a shoulder 21a formed at that location. There is mounted on the extension arm 17a in the region of the free end a shield 22 in the form of a metal shielding sheet, which engages over the protection wall 12 so that the free end thereof is in abutment with the side of the protection wall 12 facing the processing region 5 in the region of a shoulder 21b formed at that location. In the processing position BS, the upper end of the protection wall 12 located between the shoulders 21a, b is thereby surrounded by the protection element 17 at both sides.

It is also possible to see in FIG. 4 a hollow space 23 which is formed in the protection wall 12 and which can be used, for example, to receive automation components. In the present example, the hollow space 23 is closed in a light-impermeable manner and there is provided in the hollow space 23 a sensor 24 for detecting laser radiation or light entering the hollow space 23. The sensor 24 is connected to a control device 25 (cf. FIG. 2a) in technical signal terms. If the sensor 24 measures that a threshold value of the detected radiation intensity has been exceeded, this indicates damage to the protection wall 12. This is identified by the control device 25 so that it can transmit a warning to an operator and/or stop the processing of the workpiece 18. Alternatively or in addition, there may also be formed in the protection element 17 a hollow space in which automation components and/or a sensor 20 (cf. FIG. 3) can also be mounted in order to detect the introduction of radiation into the hollow space of the protection element 17. Of course, the use of the sensors 20, 24 is advantageous, in particular when very high laser powers of approximately 1 KW or more are used.

The control device 25 also serves to control the laser processing head 8 when the workpiece 18 is processed and to control the rotary drive 11 of the rotary workpiece changer 10. A linear drive for moving the protection element 12 is also controlled by the control device 18. To this end, the control device 25 accesses a store or a database in which data of the workpiece 18 and a processing program for processing the workpiece 18 are stored. In the data of the workpiece 18, the dimensions, in particular the height, of the workpiece 18 are contained. The control device 25 is programmed, using these data, to adjust an appropriate workpiece-dependent spacing A between the processing position BS and the transport position TS of the protection element 17.

In the processing machine 1 described above, the displaceable protection element 17 is advantageously combined with the provision of a free space 19 for the processing head. However, it is also possible to dispense with the displaceable protection element 17, in particular when the processing machine is not configured to process the workpiece using a laser beam, but instead the processing operation is carried out in another manner, for example, by means of a cutting processing operation. The free space 19 may be produced, for example, by the partition wall 4 being arranged so as to be spaced further from the processing region 5 than the protection wall 12 so that both only partially overlap at the side of the protection wall 12 facing away from the processing region 5. Where applicable, the partition wall 4 may also be reduced in terms of thickness in the region of the opening 16, the portion of the partition wall 4 reduced in terms of thickness extending along the side of the protection wall 12 facing away from the processing region 5.

A number of embodiments of the invention have been described. Nevertheless, it will be understood that various modifications may be made without departing from the spirit and scope of the invention. Accordingly, other embodiments are within the scope of the following claims.

The invention claimed is:

1. A method of processing a workpiece by a laser processing machine, comprising:
   moving a protection door of the laser processing machine into a processing position, the protection door being in abutment with a protection wall of the laser processing machine in the processing position;
   processing a workpiece in a processing region in the laser processing machine by a laser processing head of the laser processing machine;
   moving the protection door from the processing position into a transport position, such that the protection door is spaced from the protection wall; and
   rotating a rotatable workpiece support of the laser processing machine about a rotational axis to move the processed workpiece from the processing region into an additional operating region in the laser processing machine,
   wherein the protection wall is mounted on the rotatable workpiece support and is spaced from the protection door at the transport position along a direction parallel to the rotational axis, and wherein the protection door is movable between the processing position and the transport position along the direction parallel to the rotational axis, and
   wherein a spacing between the processing position and the transport position of the protection door is determined based on one or more dimensions of the workpiece.

2. The method of claim 1, wherein a part-region of the laser processing head engages in a free space formed above the protection wall when the workpiece is processed.

3. The method of claim 1, wherein the spacing between the processing position and the transport position of the protection door is determined based on a height of the workpiece.

4. The method of claim 1, wherein the rotating comprises rotating the rotatable workpiece support to move the processed workpiece from the processing region into the additional operating region through an opening, and
   wherein the protection door is in abutment with the protection wall in the processing position to close the opening.

5. The method of claim 1, wherein moving the protection door from a processing position into a transport position comprises moving the protection door in a linear manner between the processing position and the transport position.

6. The method of claim 1, further comprising:
   measuring processing radiation into a hollowing space of at least one of the protection door or the protection wall; and
   determining that the measured processing radiation exceeds a threshold value, and in response, performing at least one of transmitting a warning to an operator or stopping the processing of the workpiece.

7. The method of claim 1, further comprising:
   controlling a drive to position the protection door with the spacing from the processing position based on the one or more dimensions of the workpiece.

8. The method of claim 1, further comprising:
   detecting processing radiation entering a hollow space between a pair of sides of the protection wall.

9. The method of claim 8, further comprising:
   in response to the detecting the processing radiation, transmitting a warning signal to an operator.

10. The method of claim 8, further comprising:
    in response to the detecting the processing radiation, stopping the processing of the workpiece.

* * * * *